US009010803B2

(12) United States Patent
Smith et al.

(10) Patent No.: US 9,010,803 B2
(45) Date of Patent: Apr. 21, 2015

(54) DUPLEX FIRING INFLATOR

(71) Applicants: Bradley W. Smith, Ogden, UT (US);
David W. Parkinson, North Ogden, UT (US); Alan R. Larsen, Layton, UT (US)

(72) Inventors: Bradley W. Smith, Ogden, UT (US);
David W. Parkinson, North Ogden, UT (US); Alan R. Larsen, Layton, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/688,893

(22) Filed: Nov. 29, 2012

(65) Prior Publication Data

US 2014/0144340 A1    May 29, 2014

(51) Int. Cl.
*B60R 21/264*    (2006.01)
*B60R 21/26*    (2011.01)

(52) U.S. Cl.
CPC ........... *B60R 21/264* (2013.01); *B60R 21/2644* (2013.01); *B60R 2021/26029* (2013.01); *B60R 2021/2648* (2013.01)

(58) Field of Classification Search
CPC .... B60R 21/26; B60R 21/263; B60R 21/264; B60R 2021/26029; B60R 2021/2633
USPC .................. 280/736, 737, 741, 742
See application file for complete search history.

(56) References Cited

U.S. PATENT DOCUMENTS

| | | | |
|---|---|---|---|
| 3,225,695 A | 12/1965 | Kapp et al. | |
| 4,998,751 A | 3/1991 | Paxton et al. | |
| 5,179,248 A | 1/1993 | Hartman et al. | |
| 5,309,841 A | 5/1994 | Hartman et al. | |
| 5,603,525 A * | 2/1997 | Zakula | 280/737 |
| 5,668,528 A | 9/1997 | Kitao et al. | |
| 6,032,979 A | 3/2000 | Mossi et al. | |
| 6,068,291 A | 5/2000 | Lebaudy et al. | |
| 6,079,739 A | 6/2000 | Perotto et al. | |
| 6,131,947 A | 10/2000 | Mramor et al. | |
| 6,145,877 A * | 11/2000 | Rink et al. | 280/737 |
| 6,155,171 A * | 12/2000 | Haegeman et al. | 102/202.9 |
| 6,189,924 B1 | 2/2001 | Hock | |
| 6,189,927 B1 | 2/2001 | Mossi et al. | |
| 6,295,935 B1 * | 10/2001 | Swann et al. | 102/530 |
| 6,547,275 B2 * | 4/2003 | Nakashima et al. | 280/736 |
| 6,571,712 B2 | 6/2003 | Perotto et al. | |
| 6,722,694 B1 * | 4/2004 | Nakashima et al. | 280/736 |
| 7,004,500 B2 | 2/2006 | Dinsdale et al. | |
| 7,150,227 B2 * | 12/2006 | Matsuda | 102/202 |
| 7,263,929 B2 * | 9/2007 | Takahara | 102/202.7 |
| 7,347,448 B2 | 3/2008 | Smith et al. | |
| 7,374,204 B2 | 5/2008 | Hoffman et al. | |
| 7,597,353 B2 | 10/2009 | Smith et al. | |

(Continued)

OTHER PUBLICATIONS

Co-pending U.S. Appl. No. 13/688,839, filed Nov. 2012; inventors Dario G. Brisighella, Jr. et al.; title: Duplex Actuation System for Inflatable Restraints.

(Continued)

*Primary Examiner* — Paul N Dickson
*Assistant Examiner* — Barry Gooden, Jr.
(74) *Attorney, Agent, or Firm* — Pauley Petersen & Erickson

(57) ABSTRACT

A duplex firing inflator structural component and related assemblies are provided. The component includes a molded element that contains a duplex firing initiator assembly including a primary initiator operatively associated with a primary pyrotechnic output composition and a secondary initiator operatively associated with a secondary pyrotechnic output composition. The component also includes a single connector in electrical operative association with the primary and the secondary initiators.

21 Claims, 12 Drawing Sheets

(56) References Cited

U.S. PATENT DOCUMENTS

| | | |
|---|---|---|
| 7,726,687 B2 | 6/2010 | Hoffman et al. |
| 7,950,693 B2 | 5/2011 | Jackson et al. |
| 2002/0050703 A1 | 5/2002 | Whang et al. |
| 2002/0056976 A1* | 5/2002 | Nakashima et al. .......... 280/741 |
| 2004/0232679 A1* | 11/2004 | Kubo et al. ................... 280/741 |
| 2005/0200203 A1 | 9/2005 | Uono et al. |
| 2005/0206145 A1* | 9/2005 | Kato et al. .................... 280/737 |
| 2005/0250350 A1* | 11/2005 | Nakashima et al. ............ 439/15 |
| 2006/0000948 A1 | 1/2006 | Ooyabu |
| 2007/0075535 A1* | 4/2007 | Trevillyan et al. ............ 280/737 |

OTHER PUBLICATIONS

Co-pending U.S. Appl. No. 13/688,895; filed Nov. 29, 2012; inventor Eiswerth; title: Method and System for Diagnostic Measurement of Motor Vehicle Restraint System Squib Loop Resistance.

Co-Pending U.S. Appl. No. 13/688,917; filed Nov. 29, 2012; inventor Smith; title: Electrical Harness Assembly for Duplex Activation for Motor Vehicle Restraint Systems.

* cited by examiner

DUPLEX FIRING INFLATOR

BACKGROUND OF THE INVENTION

This invention relates generally to inflators for use in inflating inflatable restraint airbag cushions, such as used to provide impact protection to occupants of motor vehicles. More particularly, the invention relates to inflators having or containing multiple initiators and, more specifically, to duplex firing inflators.

It is well known to protect a vehicle occupant using a cushion or bag, e.g., an "airbag," that is inflated or expanded with gas when the vehicle encounters sudden deceleration, such as in a collision. In such systems, the airbag cushion is normally housed in an uninflated and folded condition to minimize space requirements. Upon actuation of the system, the cushion begins being inflated in a matter of no more than a few milliseconds with gas produced or supplied by a device commonly referred to as an "inflator."

Various types of inflator devices have been disclosed in the art for the inflation of an airbag such as used in inflatable restraint systems. One type of known inflator device derives inflation gas from a combustible pyrotechnic gas generating material which, upon ignition, generates a quantity of gas sufficient to inflate the airbag.

Inflatable safety restraint installations typically employ an inflator device to produce inflation gas for inflating a vehicle occupant restraint airbag cushion in the event of a collision. Such inflator devices often include a gas generant material stored within the inflator device housing and an initiator in combination with the housing that actuates the gas generant material. The initiator typically includes a reactive charge in combination with electrical connectors. A signal sent through the electrical connector(s) actuates the reactive charge, which produces reaction products that actuate the gas generant material.

In view of possibly varying operating conditions and, in turn, possibly varying desired performance characteristics, inflatable safety restraint technology has lead to the development of what has been termed "adaptive" or "Smart" inflator devices and corresponding inflatable restraint systems. With an adaptive inflator device, output parameters such as one or more of the quantity, supply, and rate of supply of inflation gas, for example, can be selectively and appropriately varied dependent on selected operating conditions such as one or more of ambient temperature, occupant presence, seat belt usage and rate of deceleration of the motor vehicle, for example.

Pyrotechnic inflators typically may have one or more chambers containing gas generant. Adaptive pyrotechnic inflators having gas generant material in two chambers, which are independently ignited via respective initiators or igniters have been referred to as "dual stage" inflators. In practice, each such gas generant material-containing chamber is oftentimes referred to as a "combustion chamber" as the gas generant material therein contained is burned or otherwise reacted to produce or form gas such as may be used to inflate an associated inflatable restraint airbag cushion.

Dual stage inflators may have several contemplated actuation or firing scenarios. In a first such scenario, only the gas generant material in a first or primary chamber and associate initiator device is actuated whereby a fixed quantity of inflation gas is produced thereby. In a second possible scenario, the first or primary initiator is first actuated whereby gas generant material in a first chamber is first reacted to start to produce or form inflation gas and after a predetermined or preselected delay, a secondary initiator is then actuated whereby gas generant material in the second chamber is reacted to also produce or form inflation gas. In a third possible scenario, both the primary and the secondary initiators are actuated whereby a gas generant material in a first chamber and a gas generant material in a second chamber are actuated simultaneously to produce or form inflation gas from the gas generant material in each of the chambers.

As will be appreciated, through the selection and use of an appropriate such actuation or firing scenario, inflator output parameters such as one or more of the quantity, supply, and rate of supply of inflation gas, for example, can be selectively and appropriately varied dependent on selected operating conditions such as one or more of ambient temperature, occupant presence, seat belt usage and rate of deceleration of the motor vehicle, for example.

Previous adaptive or dual stage inflator devices include inflator devices such as described and/or claimed in U.S. Pat. No. 7,950,693, issued 31 May 2011 to Jackson et al.; U.S. Pat. No. 7,597,353, issued 6 Oct. 2009 to Smith et al.; U.S. Pat. No. 7,347,448, issued 25 Mar. 2008 to Smith et al.; U.S. Pat. No. 6,189,927, issued 20 Feb. 2001 to Mossi et al.; and U.S. Pat. No. 6,032,979, issued 7 Mar. 2000 to Mossi et al., the disclosures of each which are hereby incorporated by reference herein and made a part hereof, including but not limited to any portions which may specifically appear herein.

Current state of the art automotive airbag technology commonly employs dual stage inflators (smart inflators) to achieve the necessary performance requirements associated with instrument panel (IP) integrity and out of position (OOP) occupants. Typically inherent with this technology are some features that are not desirable in the current automotive market. For example, the inflator devices and associated component hardware associated with such applications are commonly of a greater size and weight than optimally desired. Also, such inflator devices oftentimes suffer due to increased design complexity as well as the increased costs of the additional components and associated manufacturing processes.

As a point of reference, FIG. 1 shows a current design dual stage inflator assembly, generally designated by the reference numeral 110, and shown in a static state or condition, e.g., prior to actuation.

The inflator assembly 110 includes a housing construction 112 having a generally cylindrical external outline and such as formed of two structural components, i.e., a lower shell or base portion 114 and an upper shell or diffuser cap portion 116. The diffuser cap portion 116 is in the general form of an inverted bowl and includes a top wall 120 and a cylindrical sidewall 122, which includes a plurality of spaced, preferably, generally uniformly spaced gas exit ports 124.

The base portion 114 includes first and second mounting openings, designated by the reference numerals 126 and 130, respectively. The base portion 114 also includes a peripheral bracket 132 that extends radially outward from the housing 112 and such as may serve to form an interface attachment which is used to attach the inflator assembly 110 to a vehicle.

The housing 112 is configured to define a central first chamber 134. The first chamber 134 contains or houses a supply of a first gas generant material, such as typically in the form of a pyrotechnic, not here shown to facilitate illustration and comprehension.

Within the first chamber 134, such as in surrounding relation with the first gas generant material therein contained, is a filter assembly 140. Such a filter assembly may include one or more of a combustion screen or filter such as formed of multiple layers or wraps of a metal screen, a filter damper pad or the like.

The inflator assembly 110 also includes a retainer 144 such as may serve as a construction expedient to retain the inflator assembly components in proper relative arrangement and prevent undesired flow passage through the assembly.

A first igniter assembly, generally designated by the reference numeral 154, is mounted to the housing 112 in a location within the first chamber 134 via the first mounting opening 126. The first igniter assembly 154 may take the form of a known pyrotechnic initiator device such as includes, as is known in the art, an igniter or ignition booster cup 156 wherein is housed a canister 158, such as contains an igniter material, not here shown to facilitate illustration and comprehension. The first igniter assembly also includes a first igniter device or squib 162 in conjunction with an initiator pyrotechnic output composition (not shown), a pyrotechnic output composition containment cup and electrical isolation sleeve 163, such as made of metal, and a squib adapter or holder 164 whereby the igniter assembly 154 is mounted to or mated with the housing 112. As shown, the igniter cup 156 can take the form of a generally concave member with a cap 170 and a cylindrical sidewall 172 forming an interior 174. The igniter cup 156 can be formed of a gas-impermeable material, such as metal, with the cylindrical sidewall 172 including a plurality of positioned and spaced gas exit orifices (not shown) that are normally (e.g., when the inflator is in a static or prior to actuation state) covered and the passage of material therethrough prevented by means of a pressure sensitive covering or barrier (not shown), such as by means of an adhesive-backed foil seal wrap or the like as is well known in the art. As is known, such covering can be selected to open or rupture upon the application of a predetermined pressure thereagainst from the interior of the igniter cup 156.

When actuated, the squib 162 discharges or otherwise results in the rupture or opening of the ignition material canister 158 and, in turn, ignition of the igniter material normally contained and subsequently the gas generant material contained within the first chamber 134.

In practice, the igniter assembly 154 is connected or joined to the housing 112 such as by welding the holder 164 to the base portion 114 at the mounting opening 126.

The first chamber 134 also houses or contains a second chamber 182. The second chamber 182 includes a generant cup 184, a lid closure 185, a second igniter device or squib 190 in conjunction with an initiator pyrotechnic output composition (not shown), a pyrotechnic output composition containment cup and electrical isolation sleeve 191, such as made of metal, and a second squib adapter or holder 192 whereby the second igniter device 190 and the associated second chamber 182 are mounted or mated with the housing 112 such as via the second mounting opening 130.

The generant cup 184 and the lid closure 185 cooperate to form a generant cup interior 196 wherein is desirably placed a selected quantity of a second gas generant material such as typically in the form of a pyrotechnic as described above and not here shown to facilitate illustration and comprehension. The second gas generant material may typically be in the form of a pyrotechnic material and may be either the same or different in composition, shape, size or form, as compared to the first gas generant material.

The generant cup 184 and the lid closure 185 further desirably cooperate and function in a manner such as to permit the combustion products formed by reaction of the gas generant material contained within the second chamber 182, when properly and desirably actuated, to pass from the second chamber 182 out into the first chamber 134, through the filter assembly 140 and the exit ports 124 out from the inflator assembly 110 and into an associated airbag cushion (not shown).

As will be appreciated, there is a need and demand for improved inflator devices and component(s) thereof and associated methods of manufacture and operation of increased simplicity and reliability of operation and design. In particular, there is a need and demand for inflator devices, particularly inflator devices with multiple firing initiators, and component(s) thereof and associated methods of manufacture and operation that provide or result in specifically desired inflation performance scenarios in a less costly and/or more efficient manner (e.g., one or more of reduced size, weight and/or complexity of manufacture and/or operation).

SUMMARY OF THE INVENTION

The present invention provides an improved inflator device design and component part.

In accordance with one aspect, there is provided a structural component for a duplex firing inflator. The component includes a molded element that contains a duplex firing initiator assembly. The duplex firing initiator assembly includes a primary initiator operatively associated with a primary pyrotechnic output composition and a secondary initiator operatively associated with a secondary pyrotechnic output composition. The component further includes a single connector in electrical operative association with the primary and the secondary initiators.

According to further specific particular embodiments, the component can, for example, additionally include, contain or otherwise form one or more of the following:

a two or a three pin connector;

be integrally molded with a wall of an inflator device;

an ignition booster cup in initiating discharge receiving communication with the primary pyrotechnic output composition;

a seal for selective isolation of contents of the ignition booster cup from the primary pyrotechnic output composition;

a plurality of discreet gas exit openings disposed about the ignition booster cup;

a breakout web at a discreet gas exit opening to separate contents of the ignition booster cup from gas generant contained with an associated inflator device;

integrally molded with a wall of a dual stage inflator device;

a second stage gas generant cup for containing a second stage gas generant material ignitable by output from the secondary pyrotechnic output composition upon actuation thereof;

the primary initiator and the secondary initiator are in horizontal firing placement within the component; and the primary initiator and the secondary initiator are in vertical firing placement within the component.

In another aspect, the invention provides a dual stage duplex firing inflator device. In accordance with one embodiment, such dual stage duplex firing inflator device includes a housing having at least one gas exit port and a single mounting opening for use in association with initiator devices or assemblies. The inflator device further includes a structural component comprising a molded element containing a duplex firing initiator assembly including a primary initiator operatively associated with a primary pyrotechnic output composition and a secondary initiator operatively associated with a secondary pyrotechnic output composition. The structural component includes a single connector in electrical operative association with the primary and the secondary initiators. The structural component further includes at least one cavity or void to form a mold material runner to capture or lock the component to an associated inflator assembly housing element.

As used herein, references to a component or components as being or forming a "structural" component are to be understood to refer to such component forming a pressure containing and bearing surface of an inflator device.

Other objects and advantages will be apparent to those skilled in the art from the following detailed description taken in conjunction with the appended claims and drawings.

DETAILED DESCRIPTION OF THE INVENTION

As described in great detail below, the present invention provides an improved design and component for an inflator device. More specifically, the invention provides a component such as serves as a structural element or component for a duplex firing inflator.

Figure 1:
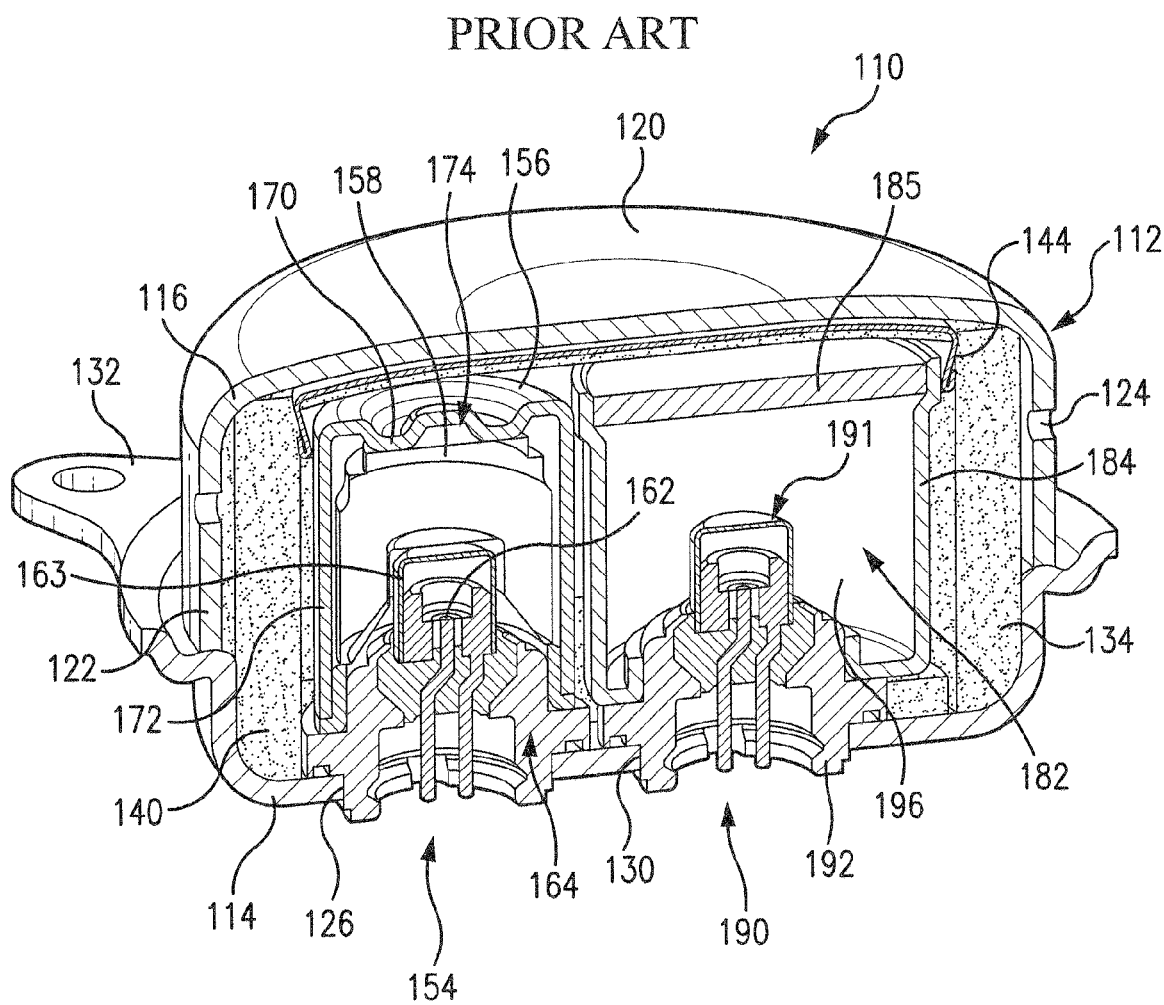
FIG. 1 is a sectional view of a dual stage inflator that is known and available in the art.
Figure 2:
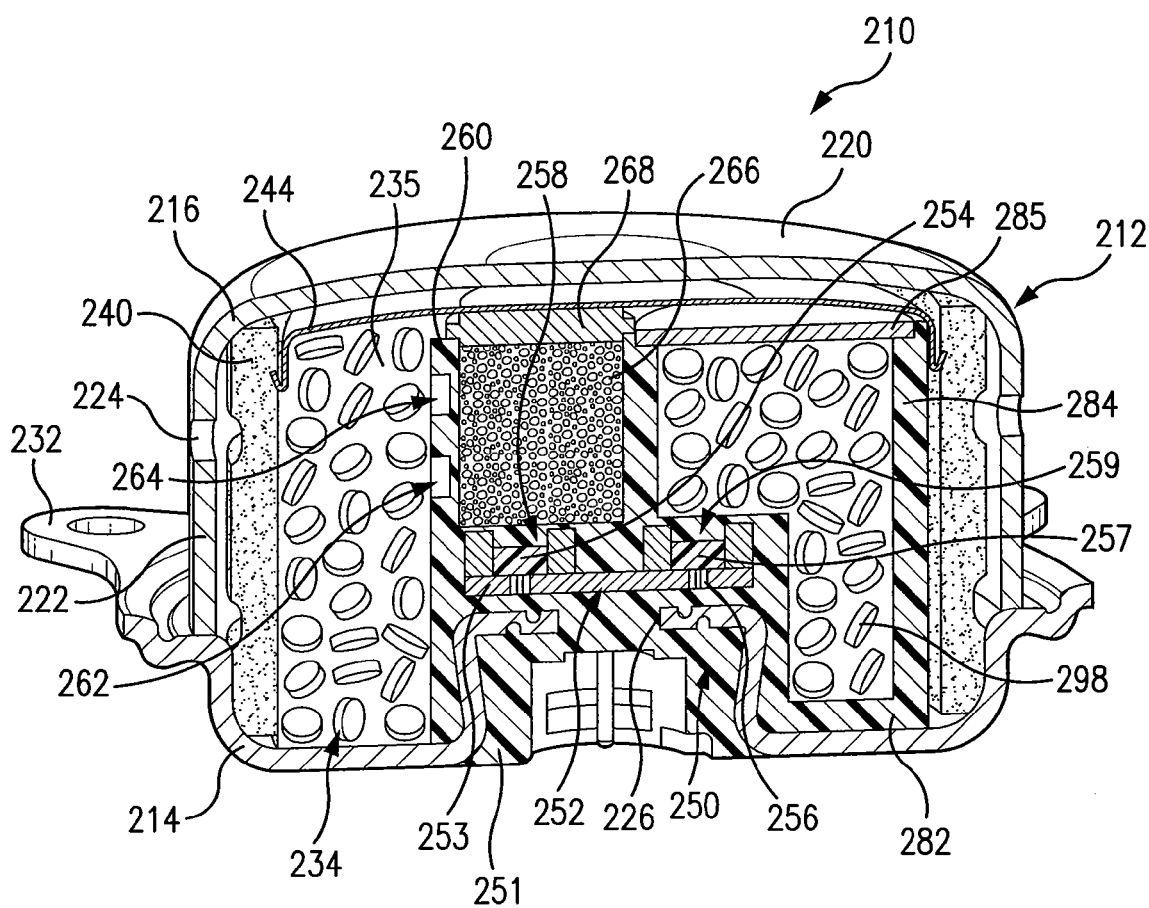
FIG. 2 is a sectional view of a dual stage duplex firing inflator in accordance with one aspect of the invention.

FIG. 2 illustrates a dual stage duplex firing inflator in accordance with one aspect of the invention and generally designated by the reference numeral 210 and shown in a static state or condition, e.g., prior to actuation. The inflator device 210 is somewhat similar to the inflator device 110 described above in that it includes a housing construction 212 having a generally cylindrical external outline and such as formed of two structural components, i.e., a lower shell or base portion 214 and an upper shell or diffuser cap portion 216, such as may desirably be made of aluminum and/or steel and appropriately joined or fastened together such as by application of an appropriate welding operation. The housing 212 is illustrated in the general form of a flattened, disk-shaped circular cylinder typically or generally having a length to diameter ratio of about 1 or less and such as sized and shaped to conveniently correspond to the shape of the vehicle steering wheel and therefore facilitate assembly in an aesthetically pleasing manner.

The diffuser cap portion 216 is in the general form of an inverted bowl and includes a top wall 220 and a cylindrical sidewall 222, which includes a plurality of spaced, preferably, generally uniformly spaced gas exit ports 224.

As will be described in greater detail below, the inflator device 210 differs perhaps most significantly from the above-described inflator device 110 in that the base portion 214 of the inflator device 210 advantageously includes only a single mounting opening 226 for use in association with initiator devices or assemblies rather than multiple mounting openings, e.g., mounting opening 126 and 130 shown in inflator device 110.

The base portion 214 may also, as shown, include a peripheral bracket 232 such as extends radially outward such as may serve to form an interface attachment which is used to attach the inflator assembly 210 to a vehicle.

The housing 212 is configured to define a central first chamber 234. The first chamber 234 contains or houses a supply of a first gas generant material 235, such as typically in the form of a pyrotechnic.

Within the first chamber 234, such as in surrounding relation with the first gas generant material therein contained, is a filter assembly 240. Such a filter assembly may include one or more of a combustion screen or filter such as, for example, formed of multiple layers or wraps of a metal screen, a filter damper pad or the like.

The inflator assembly 210 also includes a retainer 244 such as may serve as a construction expedient to retain the inflator assembly components in proper relative arrangement and prevent undesired flow passage through the assembly.

As identified above, the base portion 214 of the inflator device 210 advantageously includes only a single mounting opening 226 for use in association with initiator devices or assemblies. In particular, such benefit is realizable through the use of a structural component 250, such as herein described, for a duplex firing inflator. The structural component 250 can be a molded element 251 and contains a duplex firing initiator assembly 252. The duplex firing initiator assembly 252 includes a primary initiator 253, such as with an associated pyrotechnic output composition 254, and a secondary initiator 256, such as with an associated pyrotechnic output composition 257. In the duplex firing initiator assembly 252, the primary and secondary initiators 253 and 256 are disposed in vertical firing placement within the structural component 250.

In the duplex firing initiator assembly 252, current is conducted in a first or forward polarity through the primary initiator to actuate the primary initiator and current is conducted in a second or reverse (as compared to the first) polarity through the secondary initiator to actuate at least the secondary initiator. Such initiator assemblies are a subject of U.S. patent application Ser. No. 13/688,839, entitled, "DUPLEX ACTUATION SYSTEM FOR INFLATABLE RESTRAINTS, filed on 29 Nov. 2012 and incorporated by reference in its entirety.

As shown, the primary initiator 253 and the secondary initiator 256 in the duplex firing initiator 252 can be encapsulated in molded plastic 251 during mold processing, such as at least in part via respective plastic seals 258 and 259. This can advantageously provide sealing, confinement, electrical isolation and breakout for the pyrotechnic output composition for each initiator. In contrast, sealing, confinement, electrical isolation and breakout in present inflator devices are typically provided through the use of a metal containment cup and an electrical isolation sleeve. As will be appreciated by those skilled in the art and guided by the teachings herein provided, the elimination of these two components beneficially reduces component count, design complexity, and manufacturing processes, and can additionally reduce cost of manufacture and production.

It is to be understood, however, that if desired, a duplex firing initiator can alternatively be used in conjunction with containment cups, such as of a suitable metal, for containing respective pyrotechnic output compositions for the respective initiators.

Even in such case, however, the utilization of a duplex firing initiator as herein described, desirably eliminates the need for a second initiator adapter with its associated processing and costs and, as further described below, better aligns this new inflator technology with existing state of the art single stage inflator technology.

As shown in FIG. 2, the component molded element 251 is desirably integrally molded with the base portion 214 such as at or near the mounting opening 226. Molding is a process that has hereto previously been used in certain state of the art single stage inflators. Previous dual stage inflators have required the use of welding to join igniter adapters to inflator device chamber walls in order to maintain the necessary degree or level of chamber wall strength required to ensure safe operation of the inflator device upon actuation. Through the need for only a single mounting opening in the inflator chamber wall, inflator chamber wall strength is sufficiently maintained that mold processing can now be advantageously applied to dual stage inflators.

In the inflator device 210, the component 250 also includes an integrally molded first stage igniter booster cup 260. The booster cup 260 desirably includes discreet gas exit opening 262 to permit the exiting of reaction production upon operation. The gas exit openings 262 are also desirably integrally molded therein such as to reduce the cost of manufacture and production. The gas exit openings 262 can, as shown, include or have a thin protective breakout web 264 thereover such as to shield or protect the contents of the igniter booster cup 260 from external influences and yet appropriately open or breakout during inflator device operation.

The booster cup 260 desirably includes or contains a quantity of a suitable igniter or ignition booster material 266, such as is known in the art, to appropriately facilitate or speed desired ignition of the first gas generant material 235 upon proper actuation.

Associated with the booster cup 260 is a corresponding lid closure 268 to desirably maintain the booster material 266 in proper disposition.

Similar to the above-described inflator device 110, in the inflator device 210, the first chamber 234 also houses or contains a second chamber 282. In the inflator device 210, however, the component 250 also includes an integrally molded second stage gas generant cup 284.

The second chamber 282 also includes a corresponding or associated lid closure 285.

Similar to in the inflator device 110 described above, in the inflator device 210, the generant cup 284 and the lid closure 285 cooperate to form a generant cup interior wherein is desirably placed a selected quantity of a second gas generant material 298. The second gas generant material 298 may typically be in the form of a pyrotechnic material and may be either the same or different in composition, shape, size or form, as compared to the first gas generant material 235.

The generant cup 284 and the lid closure 285 further desirably cooperate and function in a manner such as to permit the combustion products formed by reaction of the gas generant material 298, when properly and desirably actuated, to pass from the second chamber 282 out into the first chamber 234, through the filter assembly 240 and the exit ports 224 out from the inflator assembly 210 and into an associated airbag cushion (not shown).

By molding features such as the first stage igniter booster cup 260, the booster cup gas exit openings 262, the gas exit opening breakout web 264 and the second stage gas generant cup 284 into the inflator device component 250, significant reductions can be realized in inflator size, weight and number of components, as well as in design complexity and in manufacturing processes and costs. It is to be understood, however, that the invention can be practiced as may be desired through the selective incorporation of none or one or more of such features into a desired component in accordance with the invention.

While the invention has been described above making specific reference to the inflator device 210 shown in FIG. 2 and including a duplex firing initiator wherein the primary initiator and the secondary initiator are in vertical firing placement within the component, it will be understood by those skilled in the art and guided by the teachings herein provide that the broader practice of the invention is not necessarily so limited.

Figure 3:
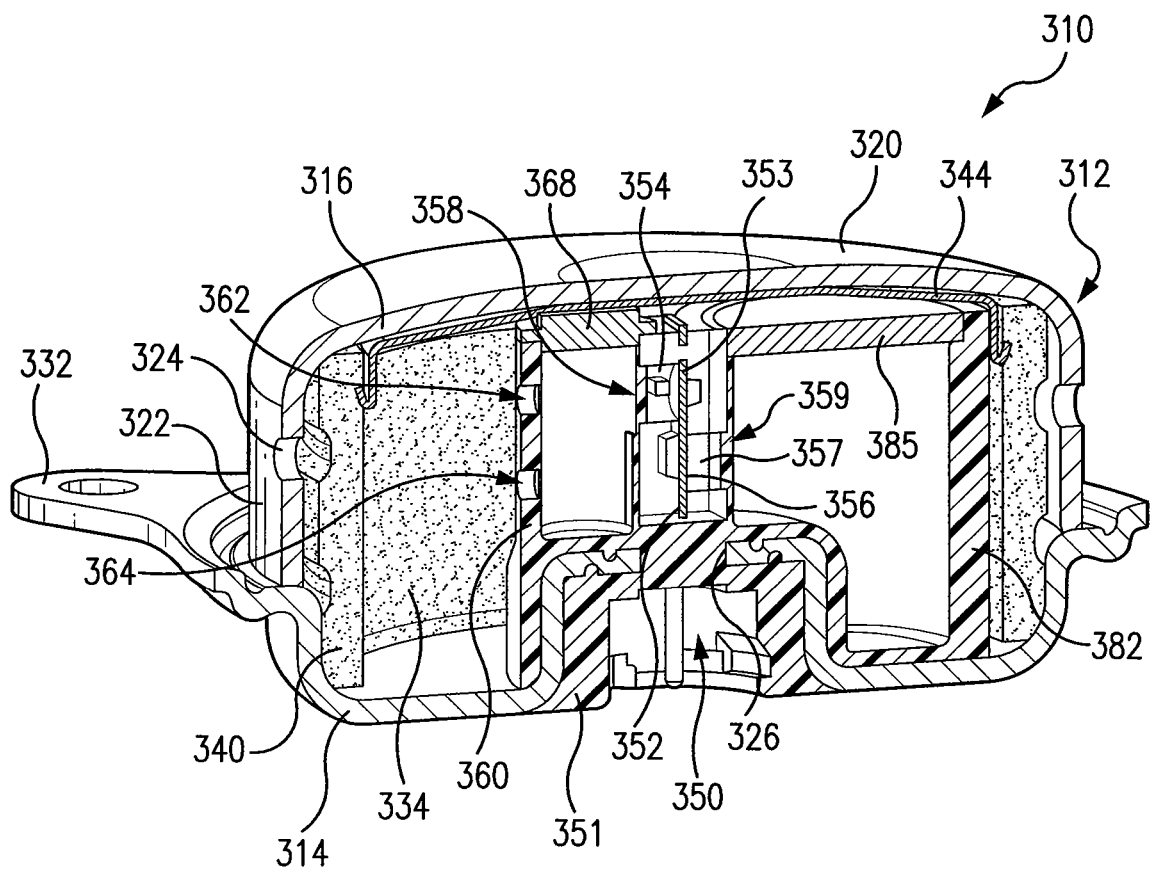
FIG. 3 is a sectional view of a dual stage duplex firing inflator in accordance with another aspect of the invention.

For example, FIG. 3 illustrates a dual stage duplex firing inflator in accordance with another aspect of the invention and generally designated by the reference numeral 310. The inflator device 310 is shown in a static state or condition, e.g., prior to actuation. The inflator device 310 is generally similar to the inflator device 210 described above in that it includes a lower shell or base portion 314 and an upper shell or diffuser cap portion 316. The diffuser cap portion 316 includes a top wall 320 and a cylindrical sidewall 322, which includes a plurality of gas exit ports 324. The base portion 314 similarly advantageously includes only a single mounting opening 326 for use in association with initiator devices or assemblies. The base portion 314 may also, as shown, include a peripheral bracket 332 such as may serve to form an interface attachment which is used to attach the inflator assembly 310 to a vehicle.

The housing 312 is configured to define a central first chamber 334. The first chamber 334 contains or houses a supply of a first gas generant material (not shown), such as typically in the form of a pyrotechnic. Within the first chamber 334, such as in surrounding relation with the first gas generant material therein contained, is a filter assembly 340. The inflator assembly 310 also includes a retainer 344, as described above.

Similar to the inflator device 210, the base portion 314 of the inflator device 310 advantageously includes only a single mounting opening 326 for use in association with initiator devices or assemblies. In particular, such benefit is realizable through the use of a structural component 350, such as herein described, for a duplex firing inflator. The structural component 350 can be a molded element 351 and contains a duplex firing initiator assembly 352. The duplex firing initiator assembly 352 includes a primary initiator 353, such as with an associated pyrotechnic output composition 354, and a secondary initiator 356, such as with an associated pyrotechnic output composition 357. The duplex firing initiator assembly 352 differs from the duplex firing initiator assembly 252 shown in the inflator device 210 in that the primary and secondary initiators 353 and 356 are disposed in horizontal, rather than vertical, firing placement within the respective structural component.

As with the duplex firing initiator 252, in the duplex firing initiator assembly 352, current is conducted in a first or forward polarity through the primary initiator to actuate the primary initiator and current is conducted in a second or reverse (as compared to the first) polarity through the secondary initiator to actuate at least the secondary initiator.

As shown, the primary initiator 353 and the secondary initiator 356 in the duplex firing initiator 352 can be encapsulated in molded plastic 351 during mold processing, such as at least in part via respective plastic seals 358 and 359.

The component molded element 351 is desirably integrally molded with the base portion 314 such as at or near the mounting opening 326.

The component 350 also includes an integrally molded first stage igniter booster cup 360. The booster cup 360 desirably includes discreet gas exit opening 362 to permit the exiting of reaction production upon operation. The gas exit openings 362 are also desirably integrally molded therein such as to reduce the cost of manufacture and production. The gas exit openings 362 can, as shown, include or have a thin protective breakout web 364 thereover such as to shield or protect the contents of the igniter booster cup 360 from external influences and yet appropriately open or breakout during inflator device operation.

The booster cup 360 desirably includes or contains a quantity of a suitable igniter or ignition booster material (not shown), such as is known in the art, to appropriately facilitate or speed desired ignition of the first gas generant material upon proper actuation.

Associated with the booster cup 360 is a corresponding lid closure 368 to desirably maintain the booster material in proper disposition.

Similar to the inflator device 210, the first chamber 334 also houses or contains a second chamber 382. In the inflator device 310, the component 350 includes an integrally molded second stage gas generant cup 384.

The second chamber 382 also includes a corresponding or associated lid closure 385.

The generant cup 384 and the lid closure 385 cooperate to form a generant cup interior wherein is desirably placed a selected quantity of a second gas generant material (not shown).

The generant cup 384 and the lid closure 385 further desirably cooperate and function in a manner such as to permit the combustion products formed by reaction of the gas generant material therein contained when properly and desirably actuated, to pass from the second chamber 382 out into the first chamber 334, through the filter assembly 340 and the exit ports 324 out from the inflator assembly 310 and into an associated airbag cushion (not shown).

Figure 4:
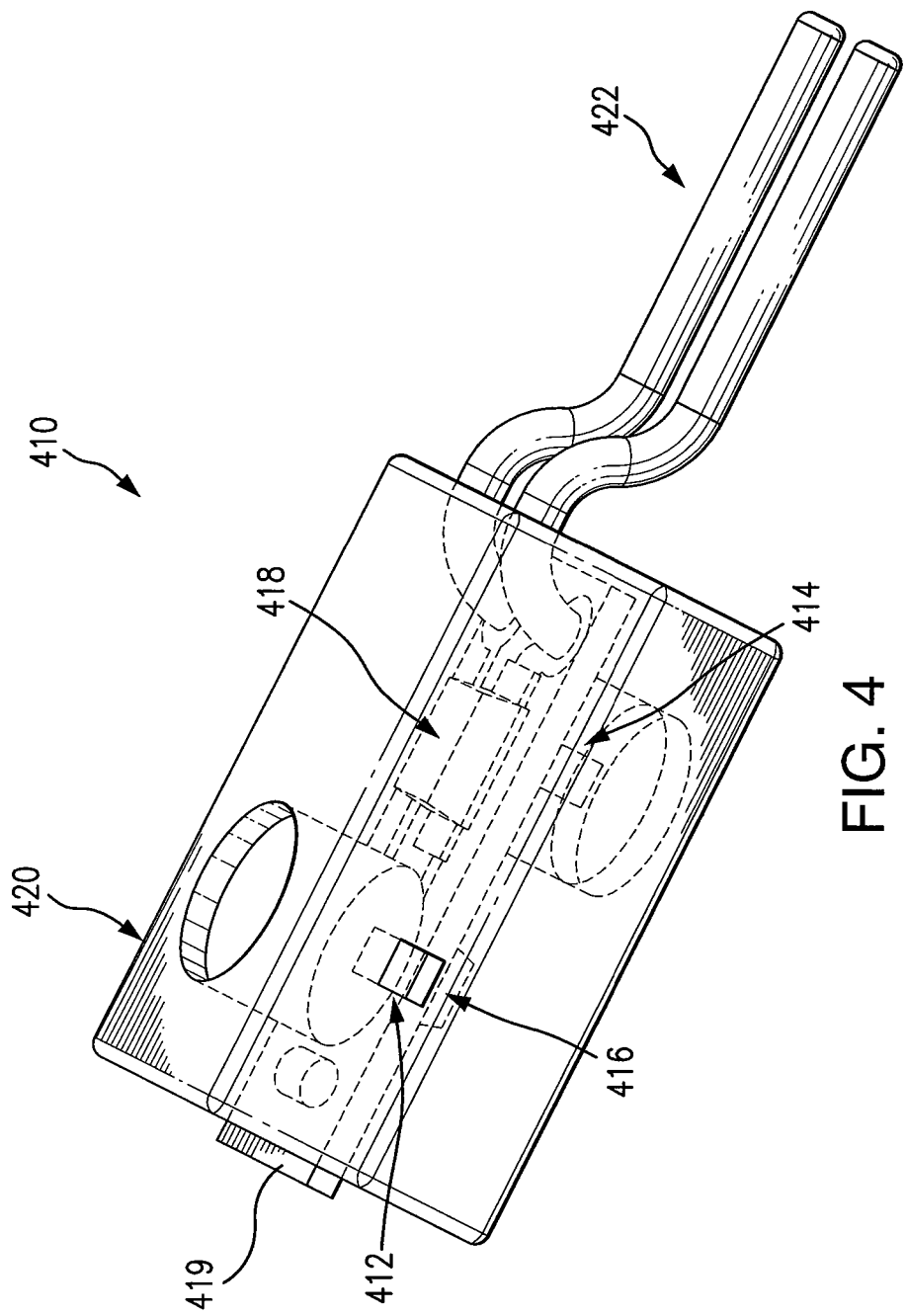
FIG. 4 is a perspective view of a duplex firing initiator in accordance with one aspect of the invention.

FIG. 4 shows a duplex firing initiator and, more specifically, a two pin duplex firing initiator, generally designated by the reference numeral 410 in accordance with one aspect of the invention.

The duplex firing initiator 410 includes primary and secondary stage initiators, 412 and 414, and first and second diodes, 416 and 418, disposed onto or with a printed circuit board (PCB) 419. As shown, such component parts can desirably be appropriately housed or contained in a common housing 420, such as may be fabricated by injection molding. The duplex firing initiator 410 includes two bent connecting pins 422 such as may serve to appropriately direct operating current to the initiator assembly 410.

Similar to the above-described duplex firing initiator 252 and duplex firing initiator assembly 352, in the two pin duplex firing initiator 410 current can be conducted in a first or forward polarity through the primary initiator 412 to actuate the primary initiator and current can be conducted in a second or reverse (as compared to the first) polarity through a secondary initiator 414 to actuate at least the secondary initiator.

The duplex firing initiator 410 is shown as having two bent connecting pins 422. Those skilled in the art and guided by the teachings herein provided will appreciate that the broader practice of the invention is not necessarily so limited. For example, if desired or required for a particular application, straight connecting pins can alternatively be employed. Further while the duplex firing initiator 410 shows the initiators 412 and 414 having opposite directed discharges, with the initiators being offset from one another, again the broader practice of the invention is not necessarily so limited. For example, if desired or required for a particular application, a suitable duplex firing initiator may contain or include primary and secondary initiators that discharge in the same general direction or in which the initiators are directly opposed to one another rather than offset.

Figure 5:
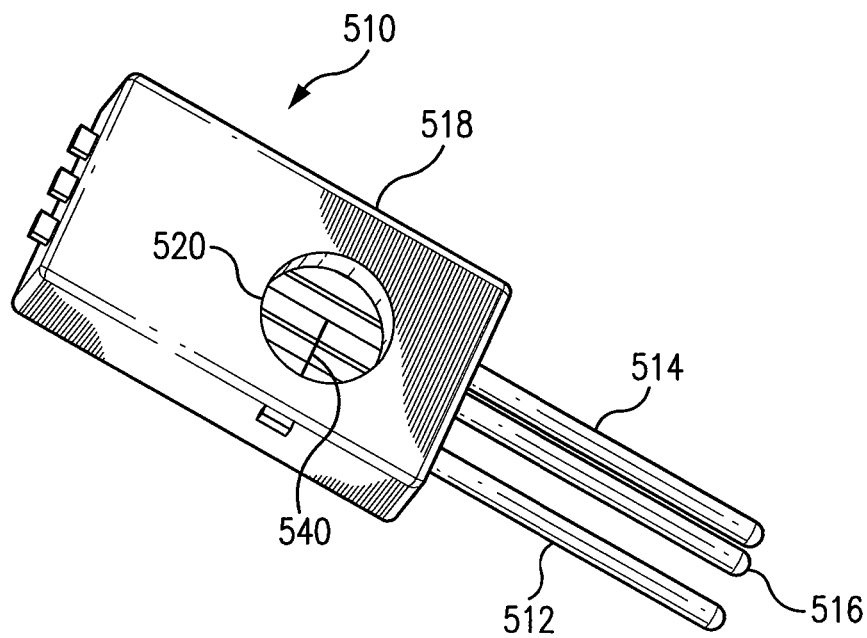
FIGS. 5 and 6 are front and back perspective views of a duplex firing initiator in accordance with another aspect of the invention.
Figure 6:
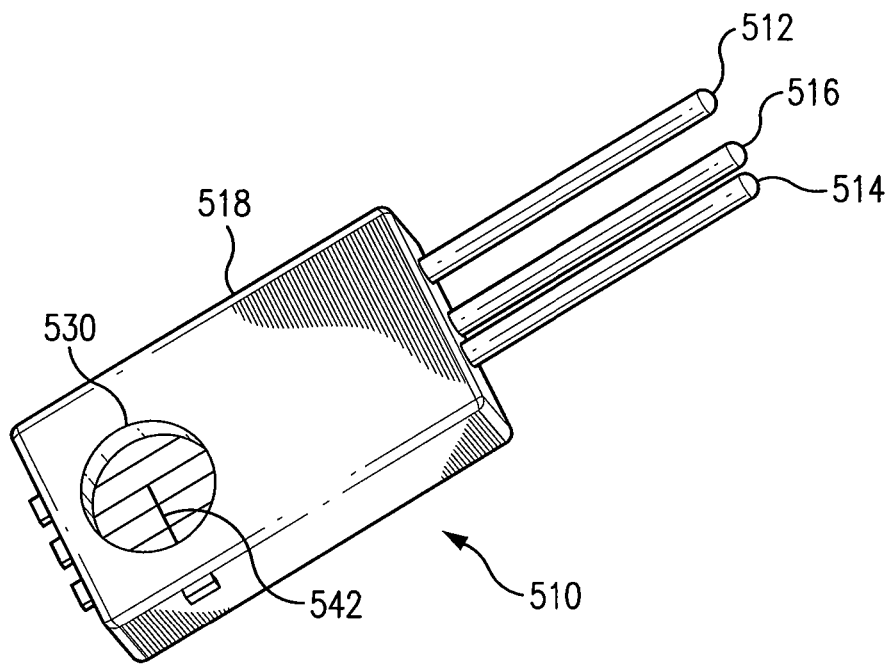

FIGS. 5 and 6 glow a duplex firing initiator and, more specifically, a three pin duplex firing initiator, generally designated by the reference numeral 510 in accordance with one aspect of the invention.

The three pin duplex firing initiator 510 includes three connecting pins, including first and second side connecting pins 512 and 514 and a center connecting pin 516. The three pin duplex firing initiator 510 has a housing 519 with a first and a second pocket, 520 and 530, respectively. Within each of the pockets 520 and 530 there is disposed a respective bridgewire element, 540 and 542, respectively, which share the center connecting pin 516 as a ground. For example, the first bridgewire element 540 extends between the first side connecting pin 512 to the center connecting pins 516 as seen in the first pocket 520. Correspondingly, the second bridgewire element 542 extends between the second side connecting pin 514 to the center connecting pin 516 as seen in the second pocket 530.

As identified above, structural components such as described above can desirably be produced or formed through mold processing. Mold processing typically requires the application of a significant amount of pressure to move plastic material through the various cavities of the mold.

Advantageously, through the practice of aspects herein described, such molding pressures can also desirably serve to consolidate a respective initiator pyrotechnic output composition.

Figure 7:
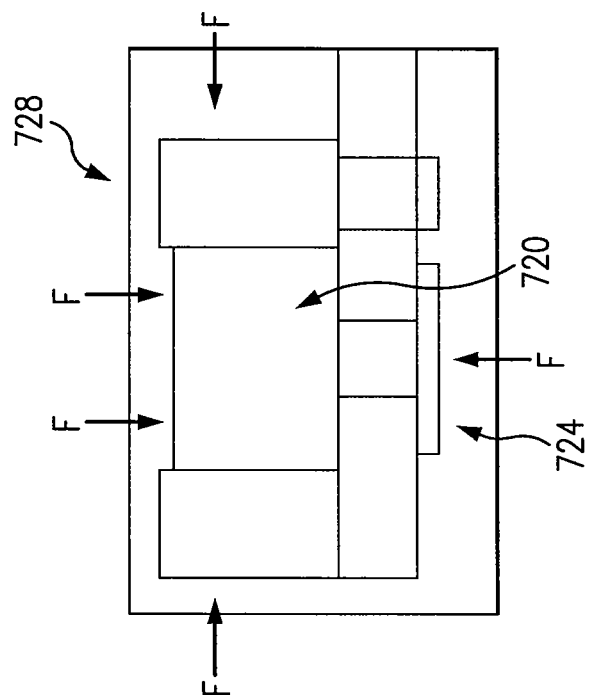
FIG. 7 is a simplified schematic showing the application of consolidating forces onto an unconsolidated pyrotechnic output composition.

For example, FIG. 7 is a simplified schematic showing the application of consolidating forces (depicted by the arrows F) onto an unconsolidated pyrotechnic output composition 720 adjacent an electrical bridge 724 of an initiator assembly 728.

Figure 8:
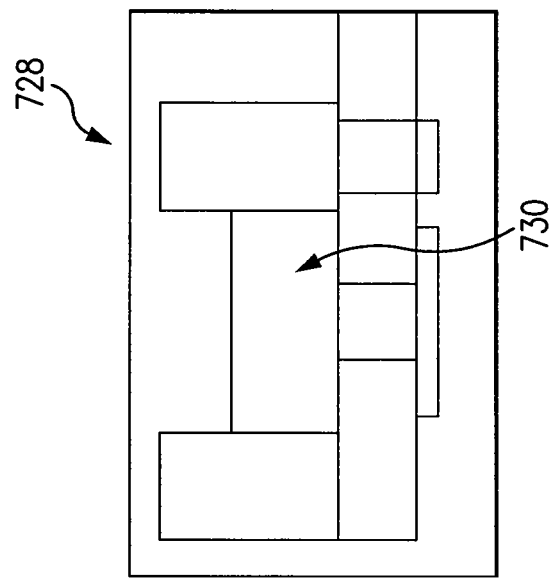
FIG. 8 shows the consolidated initiator pyrotechnic composition resulting from application of the consolidating forces shown in FIG. 7.

FIG. 8 shows the initiator assembly 728 after consolidation of the initiator pyrotechnic composition, now designated by the reference numeral 730.

As a result of or through such consolidation intimate contact by or between the electrical bridge of the initiator and the associated initiator pyrotechnic output composition can be better ensured or otherwise enhanced. This is further contrasted with prior art assemblies wherein such consolidation is commonly done as a separate or added pressing operation.

Figure 9:
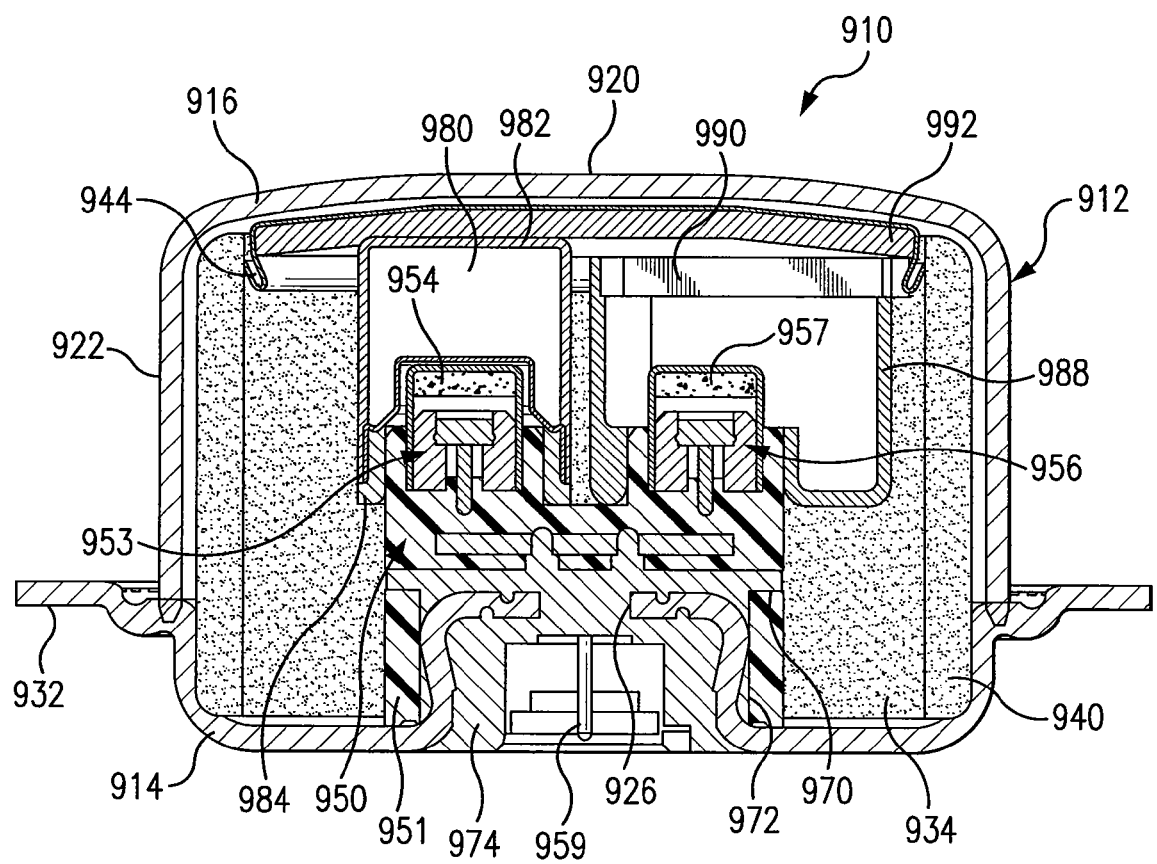
FIG. 9 is a sectional view of a dual stage duplex firing inflator in accordance with another aspect of the invention.
Figure 10:
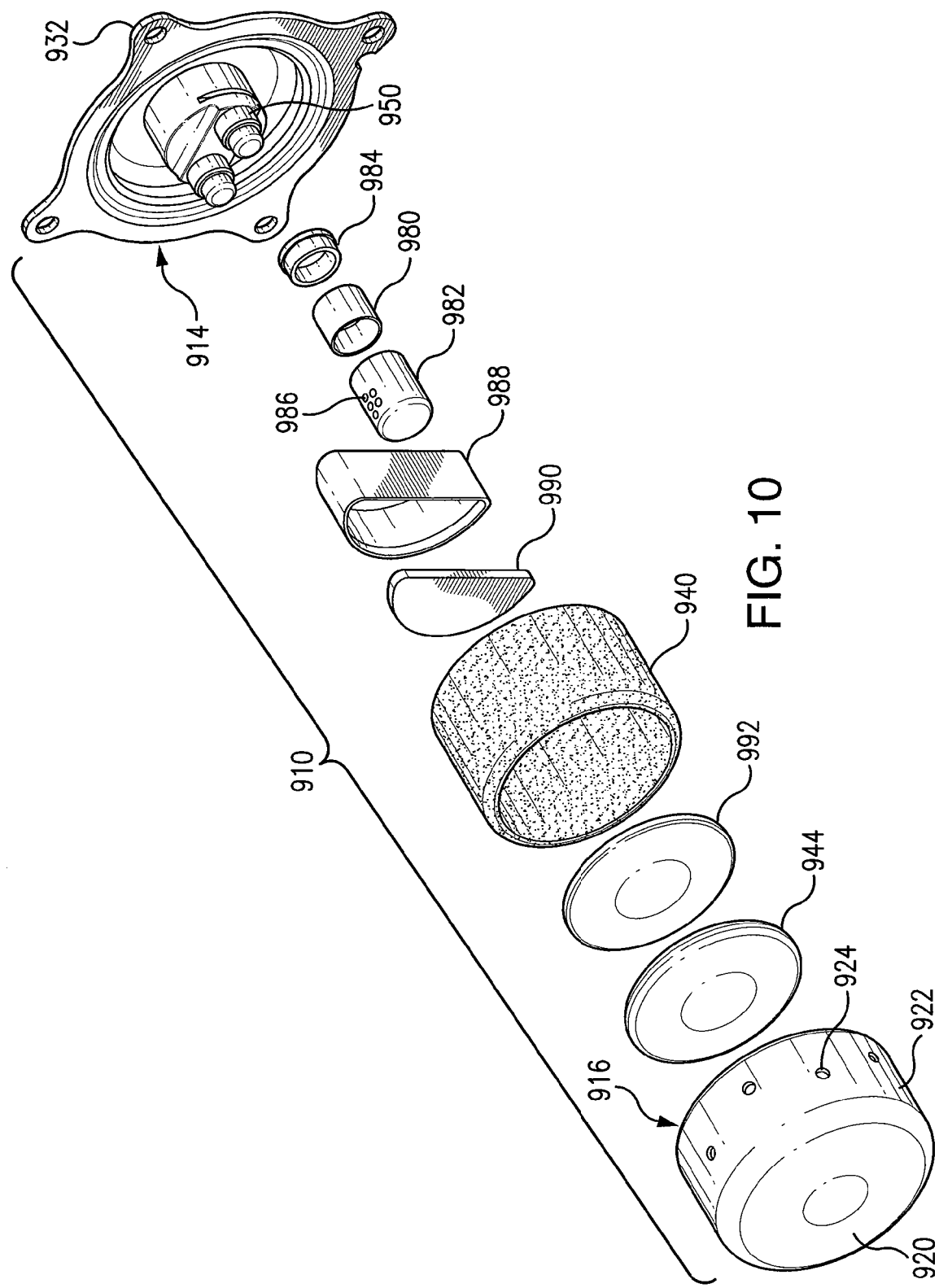
FIG. 10 is a partially exploded view of the dual stage duplex firing inflator shown in FIG. 9.

FIGS. 9 and 10 illustrate a dual stage duplex firing inflator, generally designated by the reference numeral 910, in accordance with another aspect of the invention, with FIG. 9 showing the inflator device 910 in a static state or condition, e.g., prior to actuation.

The inflator device 910 is generally similar to the inflator device 210 described above in that, for example, it includes a housing 912 such as having a lower shell or base portion 914 and an upper shell or diffuser cap portion 916. The diffuser cap portion 916 includes a top wall 920 and a cylindrical sidewall 922, which includes a plurality of gas exit ports 924. The base portion 914 similarly advantageously includes only a single mounting opening 926 for use in association with initiator devices or assemblies. The base portion 914 may also, as shown, include a peripheral bracket 932 such as may serve to form an interface attachment which is used to attach the inflator assembly 910 to a vehicle.

The housing 912 is configured to define a central first chamber 934. The first chamber 934 contains or houses a supply of a first gas generant material (not shown), such as typically in the form of a pyrotechnic, such as known in the art. Within the first chamber 934, such as in surrounding relation with the first gas generant material therein contained, is a filter assembly 940 such as described above. The inflator assembly 910 also includes a retainer 944, such as also described above.

Similar to the inflator device 910, the base portion 914 of the inflator device 910 advantageously includes only a single mounting opening 926 for use in association with initiator devices or assemblies. In particular, such benefit is realizable through the use of a structural component 950, such as herein described, for a duplex firing inflator.

Figure 11:
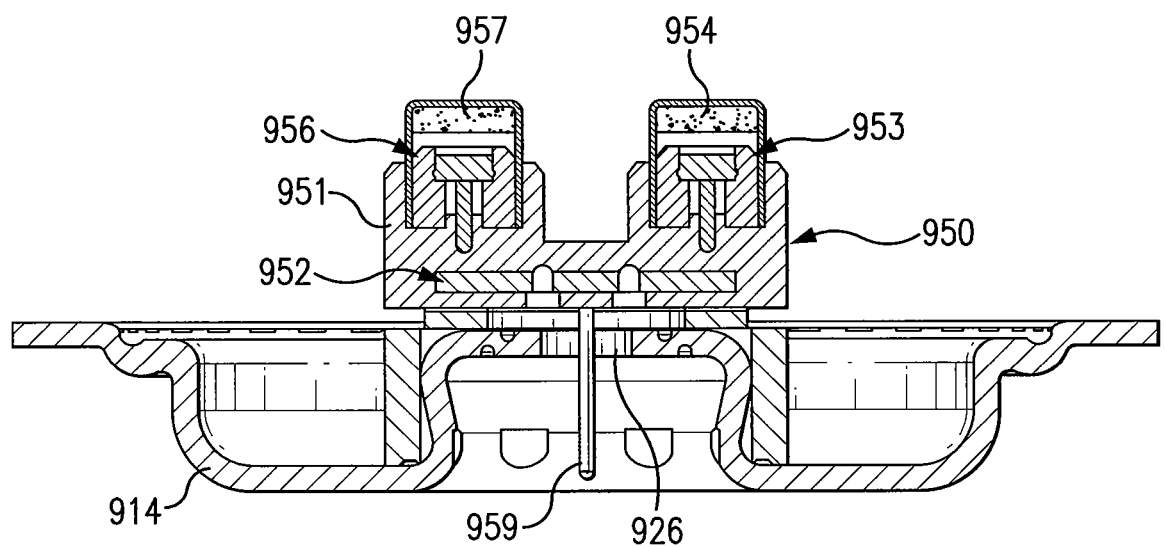
FIG. 11 is a partial sectional view showing the molded duplex initiator assembly structural component and base of the dual stage duplex firing inflator shown in FIG. 9, in isolation.

As perhaps best seen by reference to FIG. 11, the structural component 950 can be a molded element 951 and can contain a duplex firing initiator assembly 952. The duplex firing initiator assembly 952 (also shown in isolation in FIG. 12) includes a primary initiator 953, such as with an associated pyrotechnic output composition 954, and a secondary initiator 956, such as with an associated pyrotechnic output composition 957. The duplex firing initiator assembly 952 has two connecting pins 959 such as may serve to appropriately direct operating current to the initiator assembly. The primary and the secondary initiators 953 and 956 are appropriately connected via a printed circuit board (PCB) 960 and with one or more diodes 962, such as described in above-identified U.S. patent application Ser. No. 13/688,839, entitled, "DUPLEX ACTUATION SYSTEM FOR INFLATABLE RESTRAINTS, filed on 29 Nov. 2012 and incorporated by reference in its entirety.

As with the duplex firing initiator assembly 252 shown in the inflator device 210, in the duplex firing initiator assembly 952, the primary and secondary initiators 953 and 956 are disposed in vertical, firing placement within the respective structural component. Further, as with the duplex firing initiator 252, in the duplex firing initiator assembly 952, current is conducted in a first or forward polarity through the primary initiator to actuate the primary initiator and current is conducted in a second or reverse (as compared to the first) polarity through the secondary initiator to actuate at least the secondary initiator.

As shown, the primary initiator 953 and the secondary initiator 956 in the duplex firing initiator 952 can be encapsulated in molded plastic 951 during mold processing.

Figure 12:
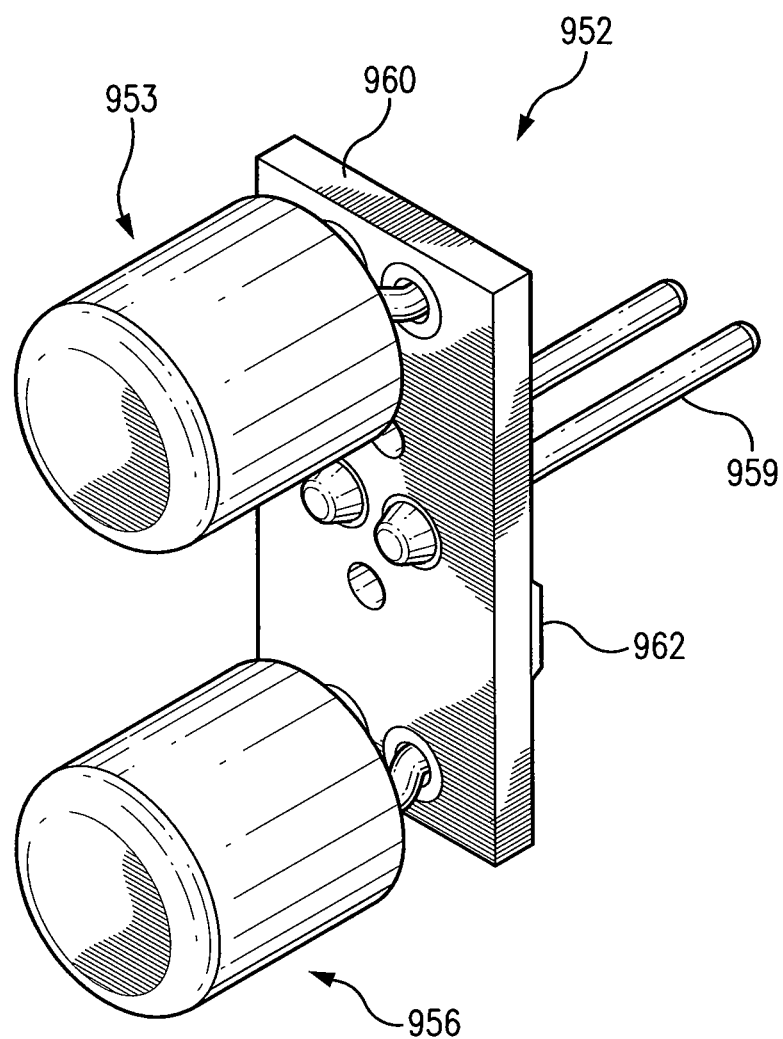
FIG. 12 is a perspective view of the duplex initiator of the dual stage duplex firing inflator shown in FIG. 9.
Figure 13:
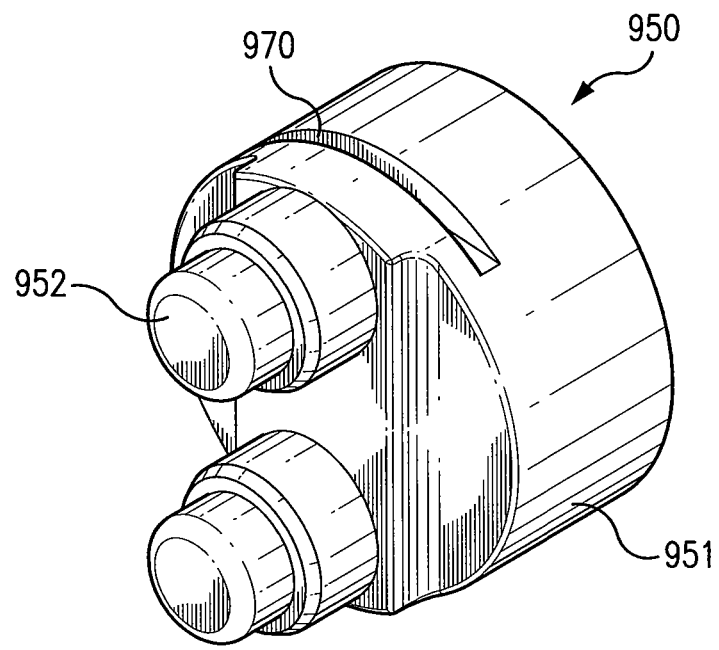
FIGS. 13 and 14 are angled front and back perspective views of the molded duplex initiator assembly of the dual stage duplex firing inflator shown in FIG. 9.
Figure 14:
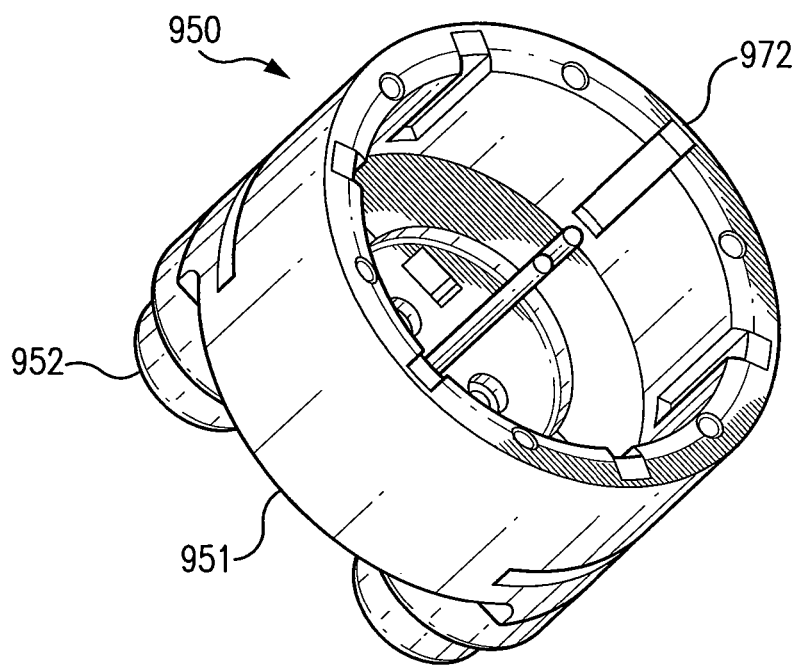
Figure 15:
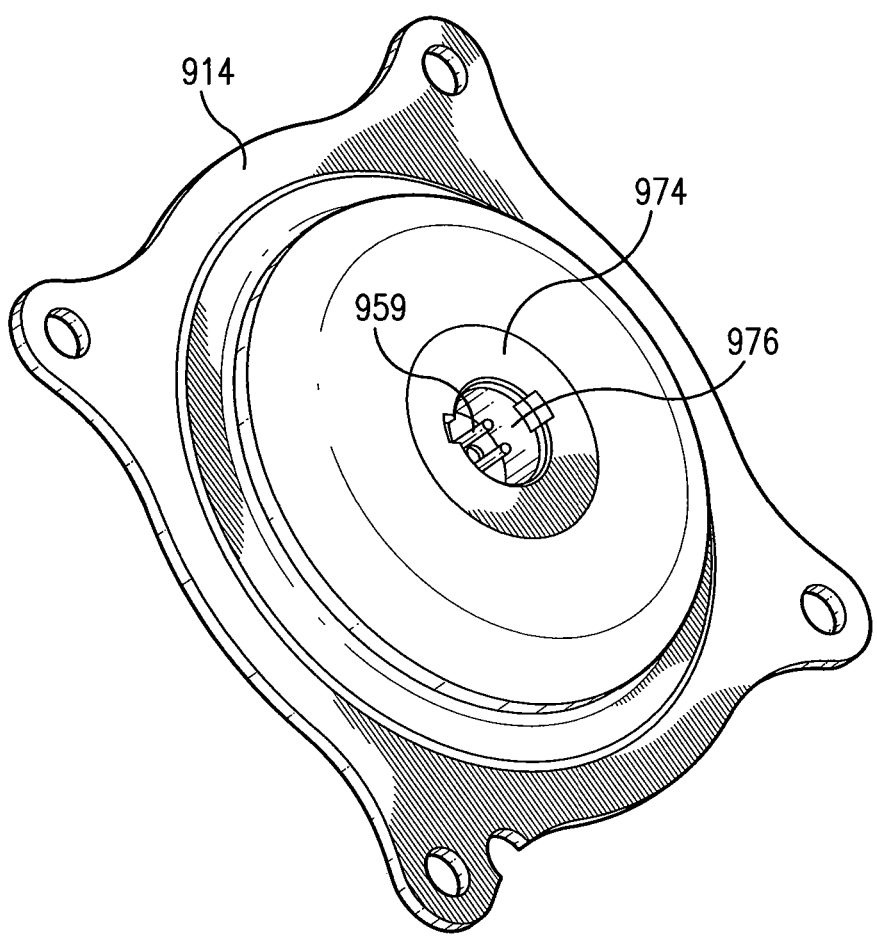
FIG. 15 is an angled back view of the inflator base with the molded duplex assembly molded thereto, shown in isolation.

While FIG. 12 illustrates the duplex firing initiator assembly 952 in isolation, FIGS. 13 and 14 illustrate a molded duplex assembly 950 such as generally composed of the duplex firing initiator assembly 952 appropriately encapsulated in molded plastic 951 in accordance with one embodiment of the invention. As shown, the encasing molding material can desirably include cavities or voids 970 and 972 such as can be used as mold material runners or as capture or locking features such as may be desirably included such as to facilitate desired placement and securement of the duplex firing initiator assembly 952 within an inflator assembly. For example, as perhaps better viewed by reference to FIG. 9, via the runners/locking features 970 and 972, the molded duplex assembly 950 can be appropriately molded onto the inner hub of the inflator base 914 such as via a molded connector, designated by the reference numeral 974. This process can desirably capture or lock the molded duplex assembly 950 onto the base 914, preferably creating a hermetic seal to the base. As shown in FIG. 15, the molded connector 974 can also desirably form or create a molded connector pocket 976 about the connecting pins 959.

A process for the assembly of the inflator device 910 will now be described by making reference to FIGS. 9 and 10. As perhaps best seen by reference to FIG. 10, an igniter cup 980 can be appropriately filled with a selected ignition booster material (not shown), sealed and inserted into an igniter canister 982. An igniter canister ring 984 can then be appropriately press fit into the igniter canister 982 and the whole igniter canister assembly can be appropriately press fit onto the molded duplex assembly 950 about the primary initiator 953, the molded duplex assembly 950 already secured to the inflator base 914. As seen in FIG. 10, the igniter canister 982 includes a plurality of holes or openings 986 to permit, upon actuation, the ignition reaction products to appropriately communicate with the contents of the first chamber 934.

A second stage cup 988 can be appropriately press fit onto the molded duplex assembly 950. The second stage cup 988 can be appropriately filled with a selected gas generant material (not shown). A second stage lid or cap 990 can be appropriately press fit into or onto the second stage cup 988 to appropriately enclose the contents thereof.

The filter assembly 940, of a desired design such as described above, can be appropriately press fit unto the inflator base 914. The first chamber 934 can be appropriately filled with a selected gas generant material (not shown). A damper pad 992 can be inserted into the filter 940 and the retainer 944 can be appropriately press fit onto or appropriately about the filter 940. The diffuser cap portion 916 can be appropriately secured to the base assembly 914 such as by means of welding or other selected form of joining components together.

Duplex firing inflators, such as herein described and provided result in the necessary performance to meet both the IP and OOP requirements. More specifically, the integration and use of duplex firing initiator assemblies and structural components including such assemblies, such as herein described, allow for changes in internal hardware which can reduce the size, weight and complexity of the inflator. This in turn decreases the number of components and the manufacturing processes and results in cost savings over the current state of the art inflators.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A structural component for a duplex firing inflator, the duplex inflator having a housing with at least one gas exit port and an external wall having a single mounting opening for use in association with initiator devices or assemblies, the structural component comprising:

a molded element integrally molded with the external wall of the inflator housing at the mounting opening in the external wall, the molded element containing a duplex firing initiator assembly including a primary initiator operatively associated with a primary pyrotechnic output composition and a secondary initiator operatively associated with a secondary pyrotechnic output composition and a single connector in electrical operative association with the primary and the secondary initiators.

2. The structural component of claim 1 wherein the single connector is a two or a three pin connector.

3. The structural component of claim 1 wherein the primary initiator and the secondary initiator are disposed in horizontal firing placement within the structural component.

4. The structural component of claim 1 wherein the primary initiator and the secondary initiator are disposed in vertical firing placement within the structural component.

5. The structural component of claim 1 wherein the molded element comprises the duplex firing initiator assembly encapsulated in molded plastic.

6. The structural component of claim 1 wherein the molded element additionally comprises at least one cavity or void to form a mold material runner to capture or lock the structural component to an associated inflator assembly component part.

7. A combination of the structural component of claim 6 and the associated inflator assembly component part, the combination additionally comprising:

a mold material disposed in the at least one cavity or void to capture or lock the structural component to the associated inflator assembly component part.

8. The structural component of claim 1 wherein the structural component additionally comprises an ignition booster cup in initiating discharge receiving communication with the primary pyrotechnic output composition.

9. The structural component of claim 8 wherein the molded element forms the ignition booster cup.

10. The structural component of claim 8 wherein the structural component additionally comprises a seal for selective isolation of contents of the ignition booster cup from the primary pyrotechnic output composition.

11. The structural component of claim 10 wherein the molded element forms the seal.

12. The structural component of claim 8 wherein the structural component additionally comprises a plurality of discreet gas exit openings disposed about the ignition booster cup.

13. The structural component of claim 12 wherein the molded element forms at least one of the plurality of discreet gas exit openings.

14. The structural component of claim 12 wherein at least one of the plurality of discreet gas exit openings disposed about the ignition booster cup includes a breakout web to separate contents of the ignition booster cup from gas generant contained with an associated inflator device.

15. The structural component of claim 14 wherein the molded element forms the breakout web.

16. The structural component of claim 8 wherein the molded element is integrally molded with a wall of a dual stage inflator device.

17. The structural component of claim 16 wherein the structural component additionally comprises a second stage gas generant cup for containing a second stage gas generant material ignitable by output from the secondary pyrotechnic output composition upon actuation thereof.

18. The structural component of claim 17 wherein the molded element forms the second stage gas generant cup.

19. A dual stage duplex firing inflator device, comprising:

a housing having at least one gas exit port and a single mounting opening for use in association with initiator devices or assemblies and the structural component of claim 1 mounted to said single mounting opening, the inflator device including a first gas generant-containing chamber in reaction initiating communication with the primary initiator and a second gas generant-containing chamber in reaction initiating communication with the secondary initiator.

20. A dual stage duplex firing inflator device, comprising:

a housing having at least one gas exit port and an external wall having a single mounting opening for use in association with initiator devices or assemblies and a structural component comprising a molded element integrally molded with the external wall of the inflator device at the mounting opening in the external wall, the structural component containing a duplex firing initiator assembly including a primary initiator operatively associated with a primary pyrotechnic output composition and a secondary initiator operatively associated with a secondary pyrotechnic output composition, the structural component including a single connector in electrical operative association with the primary and the secondary initiators, the structural component further including at least one cavity or void to form a mold material runner to capture or lock the structural component to an associated inflator assembly housing element.

21. The dual stage duplex firing inflator device of claim 20, the inflator device additionally comprising:

a mold material disposed in the at least one cavity or void to capture or lock the structural component to the associated inflator assembly housing element.

* * * * *